INVENTOR
WALTER H. SILVER
ROBERT E. COX
ATTORNEYS

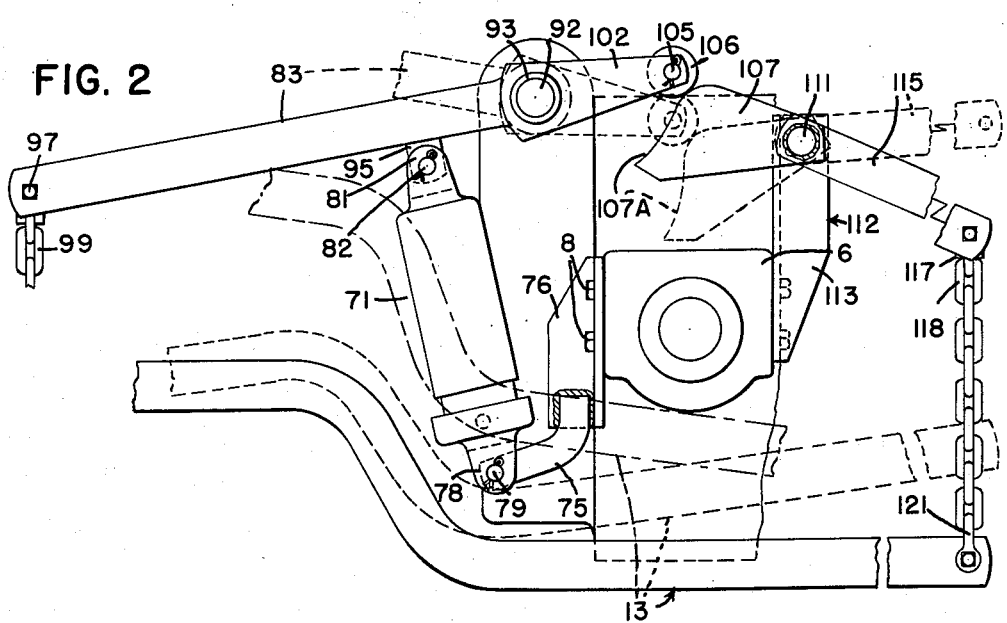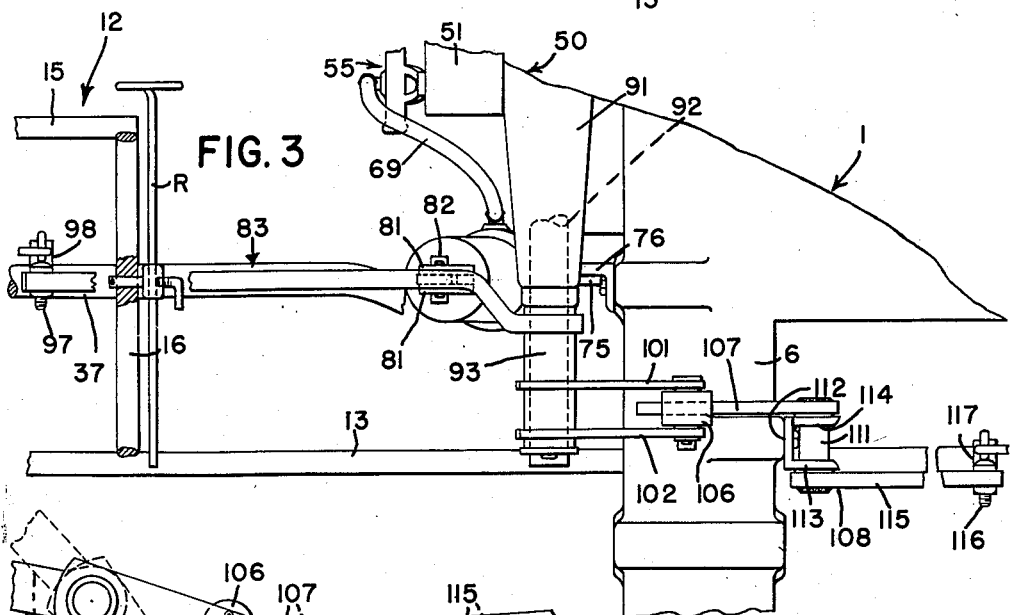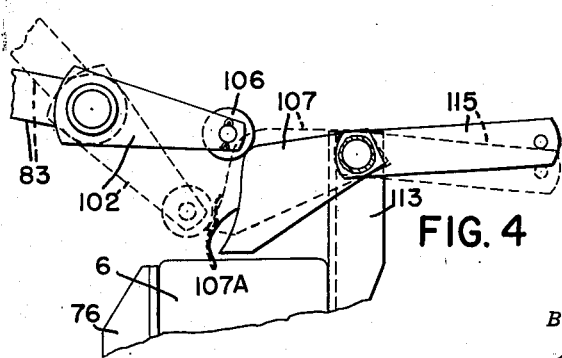

Patented Jan. 27, 1953

2,626,554

UNITED STATES PATENT OFFICE 2,626,554

POWER LIFT FOR TRACTOR MOUNTED IMPLEMENTS

Walter H. Silver and Robert E. Cox, Moline, Ill., assignors to Deere & Company, Moline, Ill., a corporation of Illinois Application April 11, 1946, Serial No. 661,368

9 Claims. (Cl. 97—50)

The present invention relates generally to tractor mounted implements and is more particularly concerned with tractor mounted plows and the like.

The object and general nature of the present invention is the provision of a combined depth adjusting and raising and lowering mechanism operative for controlling the depth and subsequently raising the plow into a transport position by means of suitable connections with the power lift on the tractor.

More specifically, it is an important feature of the present invention to provide an integral plow so constructed and arranged that all hand lever adjustments are practically eliminated. Another feature of this invention is the provision of a combined depth adjusting and lifting mechanism wherein the depth adjusting is performed during one phase of operation of the tractor power lift and the raising and lowering of the plow is performed during a second phase of operation of the tractor power lift, and a further feature of this invention is the provision of means to perform such depth adjusting, raising and lowering of the plow through suitable connections with the tractor power lift. Still further, it is a feature of this invention to provide cam means whereby the movement of the raising mechanism serves to positively control the raising and lowering of the front end of the plow beam.

These and other objects and advantages of the present invention will be apparent to those skilled in the art after a consideration of the following detailed description, taken in conjunction with the accompanying drawings wherein the preferred form of this invention has been illustrated in detail.

In the drawings:

Figure 2 is a side view, somewhat fragmentary, illustrating the action of the interconnected linkage whereby depth control and raising and lowering actions are secured successively.

Figure 3 is a fragmentary plan view of the construction shown in Figure 2.

Figure 4 is a fragmentary view showing the action of the linkage in lowering the front end of a plow beam whenever the rear end is raised toward or into its transport position.

Figure 1:
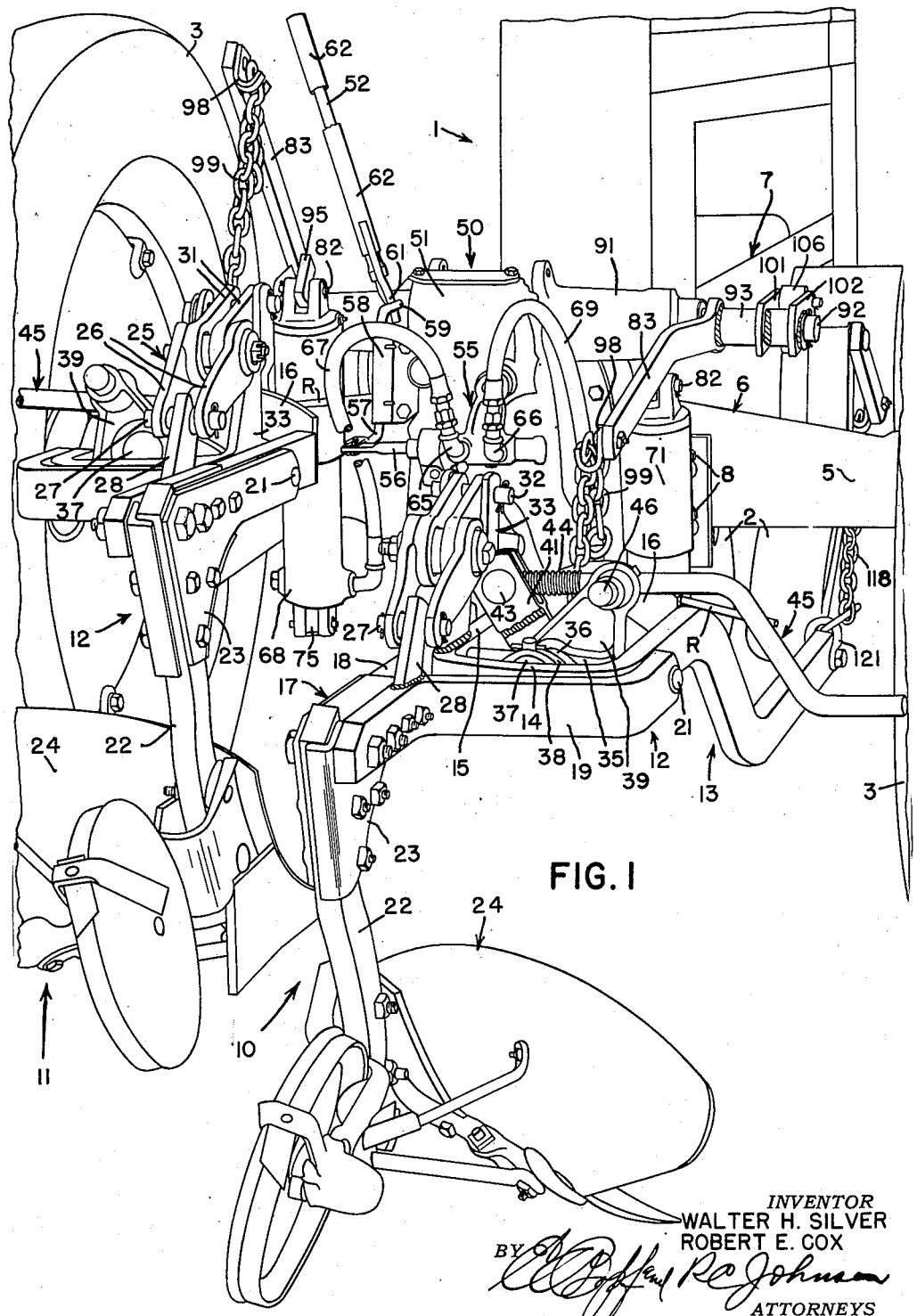
Figure 1 is a perspective view of a rear portion of the tractor and integral implement, in which the principles of the present invention have been employed.

Referring now to the drawings, more particularly to Figure 1, the tractor is indicated in its entirety by the reference numeral 1 and includes a pair of closely spaced front wheels 2 and a pair of widely spaced rear traction wheels 3 mounted on axle shafts that are carried in extensions 5 that form a part of a rear axle structure 6. The latter is secured to or forms a part of the frame 7 of the tractor, and the rear tractor axle includes attaching studs 8 or the like that are adapted to receive various implement parts.

The plow which has been shown by way of illustration as incorporating the features of the present invention is a two-way plow, including right and left hand units 10 and 11, and since these units are substantially identical, except that some of the parts are right hand while others are left hand, a detailed description of the right hand unit will suffice.

Each unit includes a plow beam 12 that is made up of a front section 13 in the form of a generally longitudinally extending bar underlying the rear tractor axle and, rearwardly of the axle, the bar 13 is bent laterally, as at 14, and then forwardly, as at 15, the forward sections being connected by a transverse arched cross bar 16. The rear section 17 of the plow beam comprises a longitudinally extending stub beam 18 and a laterally outwardly bent beam section 19, the rear portion of which is secured, as by bolts, to the rear end of the beam section 18, with a vertical shank or standard 22 connected therewith through suitable clamping plates 23. The lower end of each standard 22 carries a plow bottom 24 of more or less conventional construction. The forward ends of the beam sections 18 and 19 are apertured to receive a pair of pivots 21 by which the two parts of each beam are pivotally connected together. These parts are, however, held against pivoting under normal loads by a toggle overload release linkage indicated in its entirety by reference numeral 25. Each unit 25 includes a rear set of links 26 pivotally connected by means of a pin 27 and a bracket 28 to the interconnected beam sections 18 and 19, and the toggle linkage also includes a forward set of links 31 pivotally connected by a pin 32 and a bracket 33 to the forwardly directed section 15 of the front beam portion 13. The forward beam section 13 of each beam extends generally underneath the associated rear axle housing 6, and the front end thereof is apertured to receive a depth control connection which will be described in detail below.

The plow beam 12 of each unit is connected in draft transmitting relation with the tractor 1 by a quick detachable mechanism which is substantially the same as that shown in our U. S. Patent 2,533,521, issued December 12, 1950. Briefly, each plow beam carries a yoke 35 which is swiveled on the pivots 21 and 22 and which has a generally longitudinally extending sleeve section 36 in which the rear end 37 of a generally L-shaped draft transmitting member is received, being held in place therein by a collar 38 pinned or otherwise fixed to the rear end of the bar 37. The yoke 35 includes an upstanding arm 39, and fixed to the draft transmitting bar 37, just forward of the yoke 39, is an arm 41 that carries a screw threaded swivel 43 receiving the threaded end 44 of an adjusting crank 45 rotatably mounted in a trunnion member 46 carried by the upper end of the upstanding bracket 39. Turning the crank screw 45 serves to swing the associated plow beam about a generally longitudinal axis relative to the draft transmitting member 37.

The present invention is more particularly concerned with the mechanisms for adjusting the depth of operation and raising the plows into and lowering them out of their operating and transport positions. The tractor 1 includes a power lift unit 50. The present invention is not particularly concerned with the details of the power lift unit, and hence it will suffice to note that the power lift mechanism 50 includes a suitable source of fluid under pressure, such as a hydraulic pump, the flow of fluid being under the control of a valve mechanism which includes a valve box 51 and a valve operating handle 52. By moving the valve handle 52 in one or the other directions from a neutral position (illustrated in Figure 1) fluid under pressure is directed outwardly through an outlet to a point of utilization or may be permitted to flow back into a sump or the like. When the valve lever 52 is in a neutral position, the fluid is locked against flow in either direction. According to the present invention, a two way valve unit 55 is provided and mounted on the valve box 51 in a position to receive fluid from the unit 50 and to direct the fluid controllably back to the sump under the control of the valve mechanism. The two-way valve unit 55 includes a valve member 56 that is controlled by an operating bell crank 57 mounted in a support 58 for movement about a generally vertical axis, the support 58 being mounted on the valve box 51. The bell crank 57 has an arm section 59 at its upper end that is interconnected with an arm section 61 that is welded onto the lower end of a sleeve 62 mounted on the valve handle 52. The sleeve 62 thus serves as means for moving the valve control handle 52 either fore or aft, and, when turned, serves to shift the two-way valve operating member 56 into one or the other of two positions to make the desired selection. The two-way valve unit 55 includes two outlets, capable of selection as just mentioned, indicated at 65 and 66, respectively. The outlet 65 communicates through a hose line 67 to a left hand ram unit 68 and the other outlet 66 communicates through a second hose line 69 to a right hand ram unit 71. The right hand ram unit 71 controls the right hand plow while the left hand ram unit 68 controls the left hand plow. Each ram unit is mounted on the tractor in substantially the same way and, as best shown in Figure 2, such mounting includes a lower bracket 75 welded to an attaching angle 76 that is apertured to receive the studs 8 that are carried by the rear axle housing 6. The lower end of the ram unit 71 carries a pair of apertured ears 78 whereby the ram unit 71 is connected to the bracket 75 by a pivot pin 79. The upper end of the ram unit 71 is of similar construction, including a pair of apertured ears 81 receiving a pin 82 that connects the ram unit 71 to a lifting arm 83.

The tractor 1 is provided with a laterally extending housing section 91, and the latter receives a transverse shaft 92 which extends laterally outwardly of the housing 91 at each side of the tractor and serves as a support for the two lift arms 83. To this end, the forward end of each lift arm 83 is connected, as by welding, to a sleeve 93 that is mounted on the associated extended end of the supporting shaft 92. The pivot pin 82 connecting the ram unit 71 to the lift arm 83 is received by a downwardly extending apertured lug 95 secured, as by welding, to the lower edge of the arm 83, as best shown in Figure 2. The rear end of each of the lift arms 83 is apertured to receive a bolt 97 by which a chain-receiving clip 98 is carried thereby. A chain 99 is connected at its upper end to the clip 98 and, as best shown in Figure 1, extends loosely downwardly and at its lower end is connected to the central portion of the plow beam draft member 37. A part in the form of a pair of arms 101 and 102 is connected at its rear end to move with the left arm 83, as by being welded to the outer portion of each of the sleeves 93 to which the forward portion of the arm 83 is fixed. The arms 101 and 102 are extended forwardly, generally in the opposite direction relative to the rearwardly extending lift arm 83. At their forward ends each of the arms 101 and 102 are apertured to receive a pivot pin 105 on which a roller 106 is mounted. The roller 106 constitutes means for transmitting motion from the arms 101 and 102 to an arm 108, the roller 106 operating against a cam section 107 that forms a part of the arm or bell crank structure 108 that is pivotally mounted on the tractor. Preferably, the cam section 107 is welded to a short shaft 111 that is mounted for rotation in the upper end of a channel member 112, which may be made up of an angle 113 and a bar 114, if desired, and the outer end of the short shaft 111 receives a forwardly extending adjusting arm 115, the forward end of which is apertured to receive a bolt 116 by which a chain-receiving clip 117 is connected thereto. A depth controlling chain 118 is connected at its upper end to the clip 117, and at its lower end the chain 118 is connected by a clevis 121 to the forward end of the associated plow beam member 13.

The operation of the implement described above is substantially as follows. As best shown in Figure 1, normally the outfit is operated with one plow raised while the other is lowered, and then when the end of the field is reached the plow that is down is raised, the tractor turned around, and then the other plow is lowered into operating position. Figure 1 shows the right hand plow bottom in operating position, and according to the principles of the present invention, the power lift unit 50 is adapted to control the depth of plowing. To this end, the weight of the front end of the plow beam and the downward thrust due to the pressure of the soil is sustained by the chain 118 and the interconnected arms on the power lift unit 71, the fluid in which is locked hydraulically by the valve mechanism 51, 52. As best illustrated in Figures 2 and 4, the power lift arm 83 constitutes an operating part which is actuated by the associated unit 71 and is moved through two ranges, one a depth-adjusting range in which the arm moves between positions shown in full and dotted lines in Figure 2, the lifting chain 99 being slack in this range, and the other a lifting range, in which the chain 99 is taut and the arm 83 moves between positions shown in full and dotted lines in Figure 4. If it should be desired to decrease the depth of plowing, the sleeve 62 is manipulated to select the right hand ram unit 71, and then the valve handle 52 is pushed forwardly to raise. Such movement of the valve handle causes an additional amount of fluid to be forced into the ram unit 71. This raises the lift arm 83 a slight amount, causing the roller 106 carried by the arms 101 and 102 to act against the cam section 107 and raise the depth controlling arm 115. In this movement, the chain 99 is slack so that while the arm 83 is raised, the rear end of the plow is not lifted. In Figure 2, the position of the parts for maximum depth of plowing is shown in full lines, the arm 115 being in its lowermost position. By suitable manipulation of the hydraulic control valve mechanism, the lift arm 83 may be swung upwardly through approximately twenty degrees, and the shape of the cam 107 and the arrangement of associated parts are such that the depth adjusting arm 115 is raised into the position shown in dotted lines, this corresponding to a position of minimum plowing depth. Further upward movement of the lift arm 83 then tightens the chain 99 and begins to lift the rear end of the plow. However, by virtue of the shape of the rear edge 107a of the cam section 107, the roller 106 moves onto the dwell portion of the cam so that as the lift arm 83 moves upwardly beyond the dotted line position in Figure 2, the depth adjusting arm 115 is now held in approximately the same position. The dotted line position of the parts shown in Figure 2 corresponds to the full line position shown in Figure 4, this marking the end of the depth adjusting range of the power lift apparatus and the beginning of the lifting range. Preferably, the parts, including the roller 106 and the arms 101, 102 and 107, are so constructed and arranged that, to provide for maximum clearance between the plow beam and the tractor when the rear end of the plow beam is raised for raising the plow into its transport position, the depth controlling arm 115 is actually lowered a slight amount so as to prevent the front end of the plow beam 13 from becoming jammed against the lower side of the rear axle housing 6. The amount of lowering of the depth adjusting arm 115 while the lift arm 83 moves from its full line position (Figure 4) into its dotted line position, which is the lifting range, is shown in Figure 4, and may be as much or as little as desired or necessary, as determined by the shape of the cam section 107. The fully raised position of the plow beam 13, when the front end has been dropped down slightly while the rear end is raised for transport, is shown by dot and dash lines in Figure 2. A stand R is provided for holding each plow unit upright when it is detached from the tractor.

While we have shown and described above the preferred structure in which the principles of the present invention have been incorporated, it is to be understood that our invention is not to be limited to the particular details shown and described above but that, in fact, widely different means may be employed in the practice of the broader aspects of our invention.

What we claim, therefore, and desire to secure by Letters Patent is:

1. In a tractor mounted plow comprising a plow beam having a furrow opener at its rear end, a first member adapted to be pivotally mounted on the tractor and connected with the front end of said plow beam for raising and lowering the same to control the depth of operation, and a second member pivotally mounted on the tractor and connected with the plow beam whereby movement of said second member serves to raise and lower the plow beam into and out of a transport position, the improvement which comprises a cam connected with said first member, an arm connected with said second member and disposed adjacent said cam, means on the outer end of said arm to engage said cam and acting through the latter to move said first member, the portions of said cam engaged by said means being so shaped that said first member is lowered whenever said second member is moved to raise said plow beam into its transport position.

2. In a plow adapted to be mounted on a tractor having a power lift including a transverse shaft member, said plow including a generally longitudinally extending plow beam disposed underneath the tractor axle and extending forwardly thereof, the combination comprising a bracket carried by the tractor, an arm swingably mounted on said bracket, a connection between the forward end of said arm and the forward end of said beam, a cam section on said arm, and an arm carried by said power lift and acting against said cam section for initially raising the front end of said beam and subsequently holding said pivoted arm in substantially the same position as said power lift actuated arm is shifted through another range of movement.

3. In a tractor mounted plow having a generally longitudinally extending beam and adapted to be mounted on a tractor having a power operated unit, depth adjusting and lifting mechanism comprising a first arm adapted to be pivotally mounted on the tractor, means connecting the swinging end of said arm with the front end of said beam, a cam section carried by said arm, a second arm adapted to be pivotally mounted on the tractor and having its swinging end extending rearwardly, means establishing a lost motion connection including relatively movable parts connected between the rear end of said second arm and the rear portion of said plow beam, an operating part fixedly connected with said second arm and disposed in a position to engage said cam section whereby moving said second arm acts through said cam section to raise the front end of said beam until the lost motion in said lost motion connection is taken up and further movement of said second arm raises the rear portion of said plow beam, said cam section being formed whereby movement of said second arm and the associated operating part through its range of movement raising the plow beam acts through said cam section to hold said first arm in substantially a given position, and means for connecting said power lift unit with said second arm for operating the latter.

4. Lifting apparatus for a tractor mounted plow of the type including a generally fore and aft extending beam adapted to be disposed generally longitudinally of the tractor, said apparatus comprising a power operated part, normally slack means connecting said part with the beam rearwardly of the front end thereof to raise the same after said part has moved through a given extent, an arm adapted to be pivotally mounted on the tractor and connected with the front end of said beam to raise and lower the latter, an arm movable with said part, and cam means on said first-mentioned arm and disposed in the path of movement of said second-mentioned arm to be operatively engaged thereby, whereby when the power actuated part is moved through said given extent of movement said arms are moved to raise and lower the front end of said beam.

5. Lifting apparatus as set forth in claim 4, further characterized by said cam means being shaped so that movement of said power operated part to raise or lower said beam results in substantially little movement of said arms and the front end of said beam.

6. In a tractor mounted plow adapted to be mounted on a tractor having a power lift and a rear axle and in which said plow includes a generally longitudinally extending plow beam disposed generally underneath the tractor rear axle and extending forwardly thereof at the forward end of the beam, the combination of a first arm, means for pivotally mounting said arm on the tractor, means for connecting said arm with the front end of said plow beam for raising the front end thereof when said first arm is swung in one direction, a power lift actuated arm adapted to be movably mounted on the tractor adjacent said pivoted arm, said power lift actuated arm having two ranges of movement, motion-transmitting means movable with said power lift actuated arm and operatively engageable with a portion of said pivoted arm, said portion being shaped whereby movement of said power lift actuated arm during only one of said ranges of movement acts through said motion-transmitting means and said pivoted arm to raise the front end of said beam, and means connected to move with said power lift actuated arm during movement of the latter through its other range of movement and operatively connected with said beam, said last mentioned connecting means including lost-motion means, whereby only movement of said power lift actuated arm through said other range of movement serves to raise said plow beam relative to the tractor.

7. In a tractor mounted implement comprising a generally longitudinally extending beam disposed underneath the rear axle of the tractor, a forwardly extending arm pivotally connected at its rear portion to the tractor, means connecting the forward portion of said forwardly extending arm with the front end of said beam, a rearwardly extending arm pivotally connected at its forward end with the tractor, and lost-motion means connecting the rear end of said rearwardly extending arm with the rear portion of the beam, the combination therewith of means for connecting said arms comprising a part movable with one of said arms, a cam section on the other of said arms disposed in a position to engage said part, and means for operating said rearwardly extending arm, whereby movement of said last mentioned arm acts through said movable part and said cam section for shifting said forwardly extending arm, whereby when said rearwardly extending arm is operated to take up said lost motion, said forwardly extending arm is actuated to raise the front end of said beam.

8. In a tractor mounted plow having a generally longitudinally extending beam and adapted to be mounted on a tractor, depth adjusting and lifting mechanism comprising an adjusting arm adapted to be pivotally mounted on the tractor, means connecting the swinging end of said adjusting arm with the front end of said beam, a lifting arm adapted to be pivotally mounted on the tractor and having its swinging end extending rearwardly, means establishing a lost-motion connection including relatively movable parts connected between the rear end of said lifting arm and the rear portion of said plow beam, a part connected at its rear end with said lifting arm so as to be moved by the latter and extending forwardly to dispose its forward end adjacent said adjusting arm, and means operably connecting the forward end of said part with said adjusting arm, said connecting means including cam means on one of said adjusting arm and said last mentioned part and cam-engaging means on the other of said adjusting arm and said last mentioned part, said cam means being shaped so that when the lifting arm approaches its raised position said adjusting arm is lowered.

9. In a tractor mounted implement having a generally longitudinally extending beam and adapted to be mounted on a tractor having a power operated unit, depth adjusting and lifting mechanism comprising an adjusting arm adapted to be pivotally mounted on the tractor, means connecting the swinging end of said adjusting arm with the front end of said beam, a lifting arm adapted to be pivotally mounted on the tractor and having its swinging end extending rearwardly, means establishing a lost-motion connection including relatively movable parts connected between the rear end of said lifting arm and the rear portion of said beam, a cam section on one of said arms and a part carrying motion-transmitting means fixedly connected with the other arm and disposed in a position to engage said cam section, and means for connecting said power operated unit with one of said arms, whereby actuation of said power operated unit acts through said part and cam section to raise the front end of said beam until the lost motion in said lost-motion connection is taken up and further movement of said second arm raises the rear portion of said plow beam, said cam section being formed whereby movement of said other arm and the associated operating part through its range of movement raising the beam acts through said cam section to hold said first arm in substantially a given position.

WALTER H. SILVER.
ROBERT E. COX.

REFERENCES CITED

The following references are of record in the file of this patent:

UNITED STATES PATENTS

| Number | Name | Date |
|---|---|---|
| 433,978 | Corning et al. | Aug. 12, 1890 |
| 820,887 | McGuire | May 15, 1906 |
| 1,422,350 | Emerson | July 11, 1922 |
| 1,594,463 | Ledbetter | Aug. 3, 1926 |
| 1,609,292 | Burch | Dec. 7, 1926 |
| 2,264,575 | Knapp et al. | Dec. 2, 1941 |
| 2,306,814 | Knapp | Dec. 29, 1942 |
| 2,339,225 | Strandlund | Jan. 11, 1944 |
| 2,357,847 | Ray | Sept. 12, 1944 |
| 2,368,631 | Blalock | Feb. 6, 1945 |

FOREIGN PATENTS

| Number | Country | Date |
|---|---|---|
| 283,542 | Italy | Mar. 14, 1931 |